United States Patent [19]

Schwartz et al.

[11] 4,251,826
[45] Feb. 17, 1981

[54] METHOD OF AND APPARATUS FOR MANUAL WRITING USING CODED PULSE TRAIN

[75] Inventors: Gerhardt T. Schwartz, London; Allan S. Prior, Rochester, both of England

[73] Assignee: The Wiggins Teape Group Limited, Great Britain

[21] Appl. No.: 962,413

[22] Filed: Nov. 20, 1978

[30] Foreign Application Priority Data

Nov. 21, 1977 [GB] United Kingdom ............... 48286/77

[51] Int. Cl.³ ...................... G03G 17/02; G01D 15/06
[52] U.S. Cl. ..................................... 346/163; 346/62; 346/162; 346/165
[58] Field of Search ................. 346/163, 165, 162, 62; 354/4

[56] References Cited

U.S. PATENT DOCUMENTS

| | | | |
|---|---|---|---|
| 470,810 | 5/1892 | Lucas et al. | 346/165 |
| 2,587,319 | 2/1952 | Hogan | 346/62 |
| 2,678,373 | 5/1954 | Suran | 346/163 |
| 2,836,479 | 5/1958 | Traub | 346/163 |
| 3,074,066 | 1/1963 | Conerly | 346/163 |
| 3,161,455 | 12/1964 | Gorrell | 346/62 |
| 3,435,190 | 3/1969 | Schirmer | 346/163 |
| 3,534,382 | 10/1970 | Hurst | 346/163 |
| 3,816,839 | 6/1974 | Honda | 346/163 |
| 3,823,262 | 7/1974 | Adams | 346/163 |

OTHER PUBLICATIONS

Alden Electronics . . . Co., Westboro, Mass., Brochure on Alden Group A Recorders using Alfax paper, ©1953.

*Primary Examiner*—Jay P. Lucas
*Attorney, Agent, or Firm*—Sughrue, Rothwell, Mion, Zinn and Macpeak

[57] ABSTRACT

A stylus having an electrically-conductive writing tip is used to write on an electrically-sensitive paper, for example a metallized paper in which the metallization is eroded by the current passed by the stylus. The stylus is energized by a coded train of electrical pulses whereby the coding is reproduced in the writing which can thus be verified as genuine. The material to be written on, for example an airline ticket whose fraudulent alteration is to be exposed, may be supported on a stand having a conductive resilient arm bearing on the electrically sensitive surface to provide a return path for the stylus current. The principle can be applied with coded optical pulses directed onto an optically-sensitive paper.

7 Claims, 4 Drawing Figures

METHOD OF AND APPARATUS FOR MANUAL WRITING USING CODED PULSE TRAIN

This invention relates to a method of and apparatus for writing on material. In the context of this specification "writing" includes any making of a line, straight or curvilinear, on a material by hand or by machine.

BACKGROUND OF THE INVENTION

A particular, though not exclusive, application of the invention is to writing on metallized paper. The formation of characters on metallized paper by selective erosion of the metallization has already been proposed. In British Specification No. 1,099,871 published Jan. 17, 1968 characters are formed by matrix printing techniques such as have been developed in relation to high speed printers used with electronic data processing equipment. To this end a sheet of metallized paper is moved transversely to and in contact with a set of electrodes disposed in line. By selective energisation of the electrodes the metallization is vaporized to form the required characters.

The present invention is concerned with making lines on a material by use of a writing implement, for example a stylus used in the manner of a pen. Thus the lines formed may be written to form alphanumeric characters and the like or in forming drawings, graphs and so on. In particular there has been a need in certain security applications to give hand-writing a distinctive characteristic by which it may be verified.

BRIEF SUMMARY OF THE INVENTION

The present invention is based on the concept of making a written line in a manner which is discontinuous according to a distinctive and thus recognisable pattern. Naturally the discontinuities should not destroy the information to be conveyed by the line; that is, for ordinary recognition the line should appear substantially continuous but on inspection, if necessary under magnification or by machine, the line should reveal the pattern of discontinuities by which the line is identifiable. Thus the line contains its own coding.

The above proposal can be realised with writing on metallized paper. For manual use a stylus having an electrode as a writing tip is used to write on the metallized surface of the paper in the manner of an ordinary pen. The stylus tip is energised by a discontinuous current in a predetermined sequence of current pulses whereby the metallization is eroded in a corresponding discontinuous manner thereby coding the written line. Different codings are achievable by using different pulse sequences.

Although the invention has stemmed from the idea of coding hand-writing, it is applicable more broadly to making lines or traces with machines or to forming impressions such as by use of a die as a writing implement.

Broadly stated, in one aspect the present invention provides a method of "writing" by using an energisable writing implement coactable with an energy-sensitive writing material, wherein a line is formed on the writing material by effecting relative movement between the writing implement and the material while energising the writing implement with a train of energy pulses whereby the line is discontinuously formed in a manner corresponding to the pulse train.

In a further aspect the present invention provides writing apparatus comprising a writing implement energisable to coact with an energy-sensitive writing material and an electronic circuit for generating a train of pulses, said circuit being connected to said writing implement to energise same with said train of pulses.

According to yet another aspect of the invention there is provided writing apparatus comprising means providing a support surface for receiving an item comprising electrically-sensitive writing material; an electrically conductive member resiliently secured to overlie a portion of said support surface for contacting such writing material supported thereon; an electrically conductive writing implement for contacting such writing material to write thereon; and an electronic circuit for generating a train of pulses, said circuit being connected between said writing implement and said member to provide said train of pulses therebetween.

BRIEF DESCRIPTION OF THE DRAWINGS

In order that the invention may be better understood embodiments of it for use in producing coded writing will now be described by way of example with reference to the accompanying drawings, in which.

PRINCIPLES UNDERLYING THE EMBODIMENTS OF THE INVENTION

Before describing the illustrated apparatus in detail, the general principles upon which the apparatus is based will be discussed.

To provide a coded writing on metallized paper, a stylus is provided having a metallic writing tip which is used to write on the metallized surface in the same manner as the nib or point of an ordinary pen. Electric current is passed between the stylus tip and the paper so that the metallization is vaporized at the stylus tip as the latter moves over the paper. The writer's manuscript is coded by generating a prescribed train of current pulses which in this embodiment is formed by a repeated pulse sequence. To better illustrate this, consider two operators: P and Q. Operator P could, for example, have a coding such that if a straight line were drawn with stylus at reasonably constant speed the line would be coded as a series of equal length dashes thus: - - - -. Operator Q drawing the same line would be coded differently with, for example, alternate dashes of different length: — - — - — -. It will be appreciated that these are simple examples. Not only can different sequences of dashes of differing lengths be devised but the spacings between the dashes can differ, i.e. differing mark (dash) - space ratios, so that a large number of permutations become possible.

It is accepted that if the pulse code applied to the stylus is a repetitive sequence having pulses fixed in time, then the length of the dashes and spaces will vary with each individual operator's writing speed. In practice it is found that a given individual normally writes at a relatively constant rate. Thus in a particular writing the coding will be distinguishable from other codings. The coding should not render the writing lines so discontinuous as to harm legibility and preferably should be fine enough to give the impression of a continuous line when looked at at ordinary reading distances.

The use of coding may be used other than to distinguish between operators: it may be used to distinguish different periods of time, that is, changed from day to day or week to week for example, or distinguish between different companies.

In order to provide a wide variety of codes, it is desirable to have a pulse generating circuit the operation of which can be adjusted to provide a wide range of pulse sequences. Such a circuit will now be described with reference to FIGS. 1 and 2.

DESCRIPTION OF THE PREFERRED EMBODIMENTS

Figure 1:
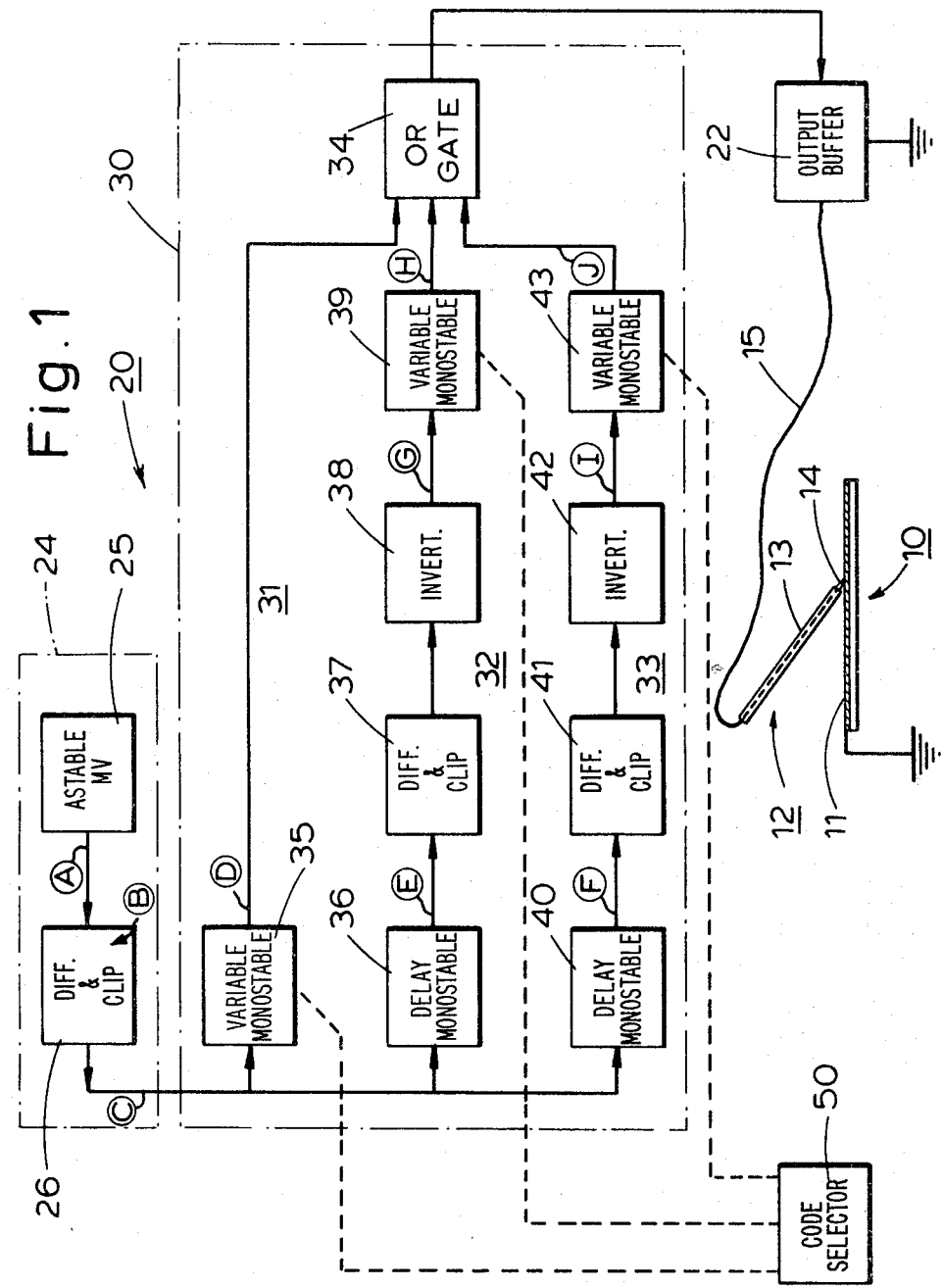
FIG. 1 shows schematically apparatus embodying the invention including a block diagram of circuitry for producing a train of pulses.

Referring first to FIG. 1, a portion of a sheet 10 of metallized paper is shown in great exaggerated thickness, the metallization 11 being upwards. The metallization is contacted by a stylus 12 which can, for example, be made after the manner of a ball-point pen, having an insulating body 13 at the lower end of which is secured a pointed metal tip 14. A flexible conductor lead 15 extends from the tip out through the upper end of the stylus body to the output stage 22 of a pulse-sequence generating circuit generally denoted 20. The output stage 22 is driven in a manner to be described to provide low voltage pulses between the stylus tip 14 and a ground or return circuit. To this end the metallization of the paper 10 has to be grounded by a clip attached to it or by being placed on a suitable support having grounded conductive means contacting the metallized surface.

The pulse generating circuitry 20 can be divided into three sections: a basic timing or clock generator 24 comprising an astable multivibrator 25 and a differentiator and clipper 26; a coding circuit 30 fed by pulses from generator 24; and the already-mentioned output buffer stage 22 which supplies drive current pulses to the stylus in accordance with the coded pulses supplied to it by coding circuit 30.

The coding circuit may be made as complicated as desired. That illustrated has three parallel channels 31, 32 and 33 all fed by the clock generator 24 and designed to produce pulses of adjustable length at different times. The pulses from the three channels are combined in an OR-gate 34 the output of which is the required coded pulse sequence.

Channel 31 contains a variable monostable 35 triggered by the clock pulses from generator 24 to produce a rectangular pulse the duration of which can be adjusted. Channel 32 comprises a delay monostable 36 triggered by the pulses from generator 24 to provide pulses of fixed duraction which, via a differentiator and clipper 37 and inverter 38, cause a variable monostable 39 to be triggered at the trailing edge of each pulse from monostable 36 and to produce a pulse the duraction of which can be adjusted. The inverter 38 merely provides the required polarity of pulse to trigger the following monostable. Channel 33 comprises a delay monostable 40 also triggered by the clock pulses from generator 24 to produce pulses of fixed but different duration to those from monostable 36. Monostable 40 is followed by differentiator and clipper 41, inverter 42 and variable monostable 43 which operate correspondingly to the similar units 37, 38 and 39 respectively in channel 32.

For each clock pulse from generator 24 one output pulse is provided from each channel 31, 32 and 33, the lengths of the respective channel pulses being dependent on the adjustment of monostables 35, 39 and 43. The three channel pulses generated in response to a given clock pulse are separated in time by virtue of the delays given by monostables 36 and 40 relative to the pulse generated immediately in channel 31 which has no delay monostable. Operation may be better appreciated by reference to FIG. 2 where the timing waveforms A to J are taken at the correspondingly encircled points A to J in FIG. 1.

The output A of the astable multivibrator is differentiated (B) and clipped to provide a positive needle pulse C from the leading edge of each positive-going multivibrator pulse at a time arbitrarily designated $t_o$. In channel 31 monostable 35 is triggered by this needle pulse to generate a pulse D adjustable in duration between $t_1$ and $t_2$ as indicated by the dotted lines in the waveform. In channel 32, monostable 36 is triggered by pulse C to generate a fixed duration pulse E terminating at $t_3$. The negative-going trailing edge of this pulse is differentiated, clipped and inverted to produce a positive needle pulse 6 at time $t_3$ which triggers monostable 39 to provide a pulse H having a duration adjusted to lie between the limits $t_3$-$t_4$ and $t_3$-$t_5$. Channel 33 is similar to channel 32. The needle pulse C triggers monostable 40 to produce a pulse F the trailing edge of which is differentiated, clipped and inverted to provide a needle pulse I at time $t_6$ which triggers monostable 48 to deliver a pulse J having a duration adjusted to lie between $t_6$-$t_7$ and $t_6$-$t_8$.

Thus in response to a clock pulse C at $t_o$ a sequence of three pulses are produced namely D, H and J which are transmitted through OR-gate 34 to output buffer stage 22. Since the sequence is repeated for each clock pulse, the line formed by the stylus 12 on the metallized paper 10 will be discontinuous having a repetitive pattern corresponding to the repetitive pulse sequence.

It will be realised that more or less than three channels can be used and that as well as, or instead of, the output pulse durations being variable, the delays provided by delay monostables 36 and 40 can be varied to provide the characteristic pulse sequence. The described circuit is thus very versatile. The changes in coding can be done by continuous adjustments or by stepped adjustments, i.e. the circuit being switchable to any one of a discrete number of selected pulse sequences by appropriate switching of timing elements in the various monostables. FIG. 1 diagrammatically illustrates how the three adjustable monostables 35, 39 and 43 have their set periods controlled by a code selector 50 such as a multi-bank, multi-pole switch or an electronically programmable device.

The circuitry described can be realised using readily available integrated circuits such as in the 7400 series well known to those in the art. For example the monostables may be type 74121.

Investigations to date indicate that a basic clock frequency of 10 Hz is suitable for hand-writing applications. This frequency gives typically a length of one millimeter for each mark and space on a unity mark-space ratio at ordinary writing speeds. Clock frequencies up to 100 Hz are currently envisaged. At this frequency the discontinuities would be so fine as to be virtually unseen by the naked eye though discernable on close examination. It might even be possible to use a variable frequency clock source, even for example one derived from human speed to provide a characteristic coding.

With TTL integrated circuits such as the 7400 series, the pulse voltages available from the various monostables is about 5 volts. The buffer stage amplifies this to produce pulses of about 20 to 30 volts for application to the stylus-paper circuit.

The principle of coded distinctive lines or traces may be applied in other fields. In chart recorders for example, and particularly in multi-pen recorders, different recording traces may be differently coded. Another example is in plotting different functions on one sheet of paper in an X-Y plotter where the traces can be individually coded.

The paper need not be metallized paper. The coding technique can be applied to any electro-sensitive paper such as the known electro-chemical papers which have found use in some chart recorders. By using the electric current pulses to drive a light source such as a light-emitting diode, corresponding light pulses are obtainable which may be emitted from a light-pen traversing an optically sensitive paper to write on the paper in a coded fashion.

It is clear that, especially in machine writing, the stylus and/or the writing material may be moved to effect relative movement between them.

Another application of the invention in the security field is that of providing a verified die stamp, on metallized paper for example, having a function similar to the watermarking of paper. If for example the die pattern were formed on a curved surface such as a cylindrical roller of metal which was rolled over the metallized paper, and a coded pulse train were applied between the paper and the die roller, then the die pattern stamped onto the metallized paper would be coded in the manner described above. This operation can be regarded as the drawing of a number of lines simultaneously all having the same coding applied to them.

Figure 3:
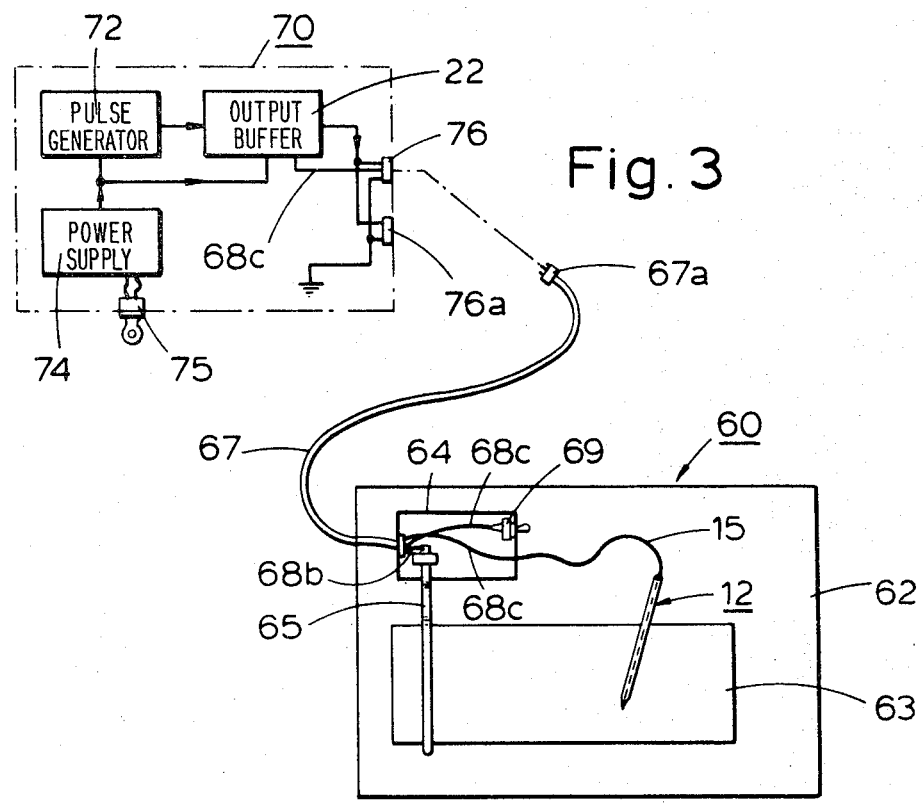
FIG. 3 illustrates diagrammatically one implementation of the invention for manually writing on eletrically-sensitized paper.
Figure 4:
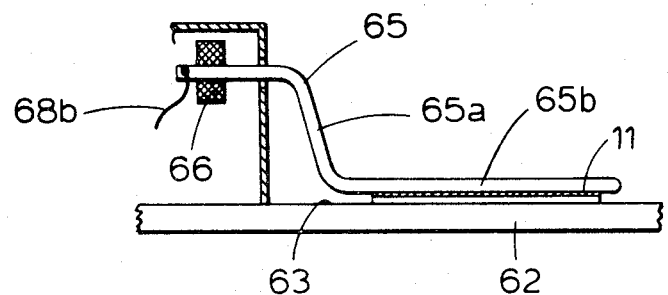
FIG. 4 illustrates a detail of the apparatus of FIG. 3.

FIG. 3 illustrates diagrammatically one form of implementation of the invention, a detail of construction being shown in FIG. 4.

This embodiment comprises a writing stand 60 equipped with the stylus 12 and a pulse generator unit 70 separately housed for location at any convenient point.

The writing stand 60 has a base 62 having a flat surface area 63 for receiving and supporting sensitized paper 11 to be written on. This will be assumed to be the above-mentioned, electrically-sensitive, metallized paper. The paper may be made up in the form of a ticket on which information is to be entered. The base 62 also carries a housing 64 from which projects an electrically conductive arm 65. The arm has one end supported in the housing 64 and projects across the paper-receiving area 63 to provide the ground contact to the metallization on the paper. This is better seen in FIG. 4, which is a side-view showing the arm 65 to have a descending portion 65a where it emerges from the housing leading to a longer portion 65b which has a free end and which is substantially parallel to and spaced from the surface 63 to allow the paper 11 to be inserted under portion 65b. The portion 65b is arranged to bear resiliently on the metallized surface of the paper to which end the arm and/or its mounting 66 within the housing may be made resilient or spring-loaded.

A connecting cable 67 terminates in the housing 64 and includes at least a conductor 68a connected to the flexible conductor 15 leading to stylus 12 and a ground conductor 68b connected to the arm 65. The remote end of cable 67 has a plug 67a that mates with a socket on the unit 70 to provide energisation for the stylus 12.

Figure 2:
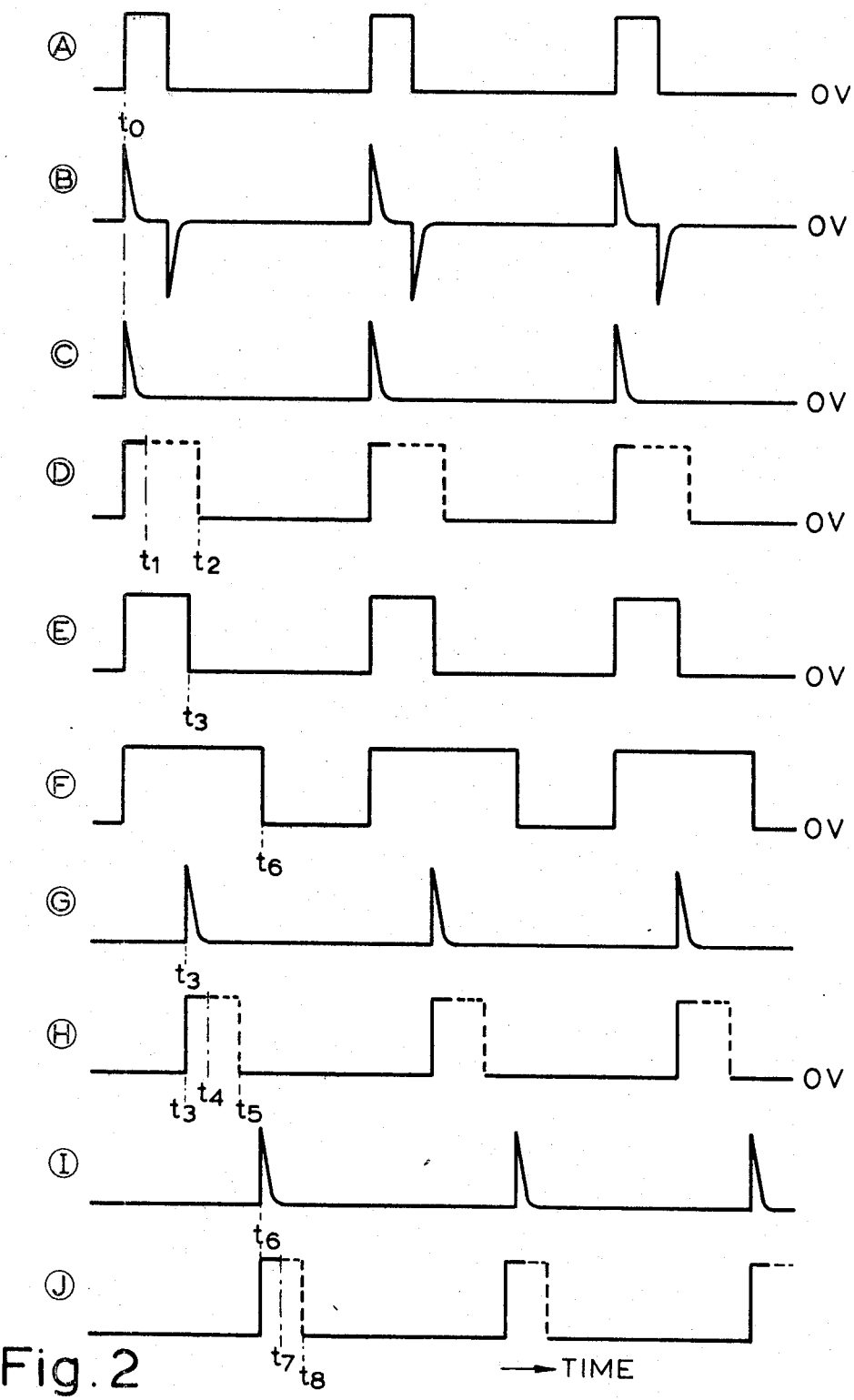
FIG. 2 shows a number of waveforms denoted A to J which appear at the circuit points indicated by the encircled letters A to J on FIG. 1.

The unit 70 contains pulse-generating circuitry 72 which may be that described with reference to FIGS. 1 and 2 or may be adapted in accordance with whatever coding is adopted. For example, it may suffice to produce a simple dashed line using pulses of a fixed mark-space ratio. In this case the pulse-generating circuitry can be made simpler than shown in FIG. 1 and the code select switch 50 is dispensed with. The pulse-generating circuit 72 feeds a buffer stage 22, as shown in FIG. 1, and the unit 70 also includes its own power supply unit 74. Preferably the P.S.U. is turned on-and-off by a key-operated switch 75 to prevent unauthorised use of the apparatus. The unit has an outlet socket 76 to receive plug 67a and to which the output of the buffer stage is connected.

Additional sockets such as 76a can be connected in parallel with socket 76 to enable a number of writing stands 60 to be energized from the same pulse generator unit 70. It may be desired on occasion to use continuous (non-coded) writing and to this end the housing 62 of the writing stand has a switch 69 connected via conductors 68c in cable 67 to the unit 70, for selectively turning buffer stage 22 continuously on or connecting the stylus 12 to some other circuit point from which a continuous current is available.

What is claimed is:

1. In a method of "writing" by using a hand-held energisable writing implement coactable with an energy-sensitive writing material, wherein a line is formed by effecting relative movement between the writing implement and the material while energising the writing implement with a train of energy pulses whereby the line is discontinuously formed in a manner corresponding to the pulse train, the improvement characterised by: the written line being given a distinctive coding by providing said pulse train as a repeated predetermined sequence of pulses, the predetermined pulse sequence comprising pulses of differing duration and/or with differing pulse intervals.

2. A method as claimed in claim 1 in which the pulses are electrical and are applied between a stylus having a material-contacting electrode and an electro-sensitive material.

3. Writing apparatus comprising: a hand-held writing implement energisable to coact with an energy-sensitive writing material and an electronic circuit for generating a train of pulses, said circuit being connected to said writing implement to energise same with the train of pulses, said electronic circuit comprising a clock pulse generator and coding means responsive to each clock pulse to generate a predetermined sequence of pulses including pulses of differing durations and/or with differing pulse intervals, whereby said train of pulses comprises said pulse sequence repeated for each clock pulse.

4. Writing apparatus as claimed in claim 3 in which said coding means comprises a plurality of parallel channels responsive to each clock pulse, each channel comprising means operable in response to each clock pulse to produce an output pulse at a selected time and/or of a selected duration, and means for combining the output pulses from the channels to form said predetermined sequence of pulses in response to each clock pulse.

5. Writing apparatus as claimed in claim 4 in which said coding means includes means selectable among a number of conditions to alter parameters of said channels effecting the times at which the output pulses are produced and/or the durations of the output pulses, whereby a different predetermined pulse sequence is produced for each condition of said selectable means.

6. Writing apparatus comprising: means providing a support surface for receiving an item comprising electrically-sensitive writing material; an electrically conductive member resiliently secured to overlie a portion of said support surface to be resiliently urged into electrical contact with such writing material supported thereon; a hand-held electrically conductive writing implement for contacting such writing material to write thereon; and an electronic circuit for generating a train of pulses comprising a predetermined repeating sequence of pulses including pulses of differing durations and/or with differing pulse intervals, said circuit being connected between said writing implement and said member to provide said train of pulses therebetween.

7. Writing apparatus as claimed in claim 6, in which said electronic circuit comprises a clock pulse generator and coding means responsive to each clock pulse to generate said predetermined sequence of pulses, whereby said train of pulses comprises said predetermined pulse sequence repeated for each clock pulse.

* * * * *